July 17, 1956   R. E. BASTIAN   2,754,726
APPARATUS FOR ENGRAVING POSITIVE TIRE TREAD MODELS
Filed Oct. 22, 1953   8 Sheets-Sheet 1

INVENTOR.
RAYMOND E. BASTIAN
BY
W. A. Fraser
ATTY.

July 17, 1956  R. E. BASTIAN  2,754,726
APPARATUS FOR ENGRAVING POSITIVE TIRE TREAD MODELS
Filed Oct. 22, 1953  8 Sheets-Sheet 2

INVENTOR.
RAYMOND E. BASTIAN
BY
W. A. Fraser
ATTY.

July 17, 1956  R. E. BASTIAN  2,754,726
APPARATUS FOR ENGRAVING POSITIVE TIRE TREAD MODELS
Filed Oct. 22, 1953  8 Sheets-Sheet 8

FIG. 15
FIG. 16

INVENTOR.
RAYMOND E. BASTIAN
BY
W. A. Fraser
ATTY.

United States Patent Office 2,754,726
Patented July 17, 1956

2,754,726

APPARATUS FOR ENGRAVING POSITIVE TIRE TREAD MODELS

Raymond E. Bastian, Akron, Ohio, assignor to The Firestone Tire & Rubber Company, Akron, Ohio, a corporation of Ohio Application October 22, 1953, Serial No. 387,774

6 Claims. (Cl. 90—13.1)

The invention relates to a machine for engraving plaster models used in the manufacture of cores required in the casting of precision tire mold tread inserts which may be made of aluminum, or iron. A conventional method of engraving these models is to do it entirely by hand, which is obviously a slow, tedious and expensive process due to the intricate and widely varying tread designs of conventional tires.

While a split arcuate model mold section of plaster of Paris identical with a tread section of a finished tire can be duplicated by making a negative mold of a rubbery plastic material, every tire requires several different master models, so that the tread design which appears to follow a uniform pattern is actually varied sufficiently to avoid tire vibration or "sing" when running. Consequently, the casting of the tread inserts for each complete tire mold requires the hand engraving of several models.

Where the tread design is relatively complicated, the hand work may involve separately hand carving strips representing sections of the tread, and then piecing them together on the model by gluing. Obviously, such practice is inaccurate as well as tedious, because the accuracy of the tread design depends upon the skill and craft of the engraver. Thus, it has been difficult to control the variations sufficiently to keep them within required tolerances.

Another method of forming the plaster model or pattern is disclosed in U. S. Patent No. 2,560,052, issued July 10, 1951, to John L. Miller and John R. Boughter. This method is quite complicated and expensive and involves hand engraving tread grooves of short length in a pattern annulus, filling the grooves with hardenable plastic material and hand carving ribs therefrom, molding a negative image of the ribs in a section of resilient material, hand engraving tread grooves of long length in second pattern section, superposing the sections with the grooves in registry, and casting melted wax in the grooves, removing said second section with the molded wax ribs and indexing said section relative to the first section to register further grooves of the second section with grooves of the first, casting additional wax in the grooves, and then using the second section with its molded ribs to form the positive plaster model with tread grooves complementing the ribs.

It is apparent that this method is not only laborious and expensive, but also requires considerable hand work in cutting the original long and short grooves from which the negative tread ribs are cast, and in hand carving the short ribs of plastic material in the pattern annulus after the material has hardened.

It is a principal object of the present invention to provide a novel apparatus or machine capable of engraving the plaster models used in casting tire mold tread inserts, to the extent of eliminating substantially all hand work.

Another object is to provide a novel machine for engraving plaster models of tire tread sections with a high degree of accuracy.

Another object is to provide a novel engraving machine which will operate an engraving tool in three dimensions simultaneously and at proper radii to cut a pre-designed groove in proper relationship in the model.

A further object is to provide a novel engraving machine which will operate an engraving tool on the correct radius of the tire as a whole while cutting grooves in the tread on different radii correlated to the transverse contour of the tread of the model.

Another object is to provide a novel engraving machine which is adapted to engrave a wide range of designs on models for treads of a wide range of sizes of tires.

A still further object is to provide a novel engraving machine adapted to engrave various designs and contours on the sides of the tread section of the model.

Finally, it is an object of the present invention to incorporate all of the foregoing objections in a solid and compact machine which is easily adjusted for accurately engraving various designs and sizes of tire tread models over a wide range.

These and ancillary objects are accomplished by the parts, arrangements and combinations comprising the present invention, a preferred embodiment of which is shown by way of example in the accompanying drawings, and hereinafter described in detail. Various modifications and changes in details of construction may be made within the scope of the invention as defined in the appended claims.

In the novel engraving machine of the present invention, the cutting tool is rotatably carried on a track curved in a plane at right angles to the median plane of the model, representing a split arcuate section of the tire, on a radius correlated to the transverse contour of the tread, and the track is bodily rotatable circumferentially about the model. The tool is initially set to a template located at one end of the model and conforming to a cross section of the tread, and the tool is guided through the model by following a circumferential template having the desired pattern or design.

Referring to the drawings.

The novel engraving apparatus is preferably supported on a metal table having a precision made bed 20 resting on tubular legs 21 which may be bolted to a suitable foundation so that the bed is level. A precision indexing rotary table top 22 of conventional construction is mounted on the bed 20, preferably at one end thereof, and has a hand wheel 23 for rotating the table top to any desired degree. At one side of the table top 22 is a horizontal plate 24 for supporting the plaster model M to be engraved, the plate being supported on bars 25 adjustably mounted in parallel slots 26 provided in the table top by bolts 25'. The bottom surface of the model M is flat and corresponds to the parting line of the mold which is at the median plane of the tire.

The model M preferably is clamped in proper position on the plate 24 by clamps 27 each having a base plate 28 adjustably secured to the plate 24 by a clamping bolt 28', and a telescopically adjustable center post 29 for clamping models of various heights. A clamping arm 30 is pivoted on the top of the post, one end of the arm being abutted by a clamping screw 31 threaded through a bracket arm 31' on the post to clamp the other end of the arm against the top of the model.

An upright supporting column 32 is mounted on the table top 22 in an offset location with respect to the center thereof. Preferably, the column has a diamond-shaped base plate 33 which is secured to the table top by bolts 34, the column being laterally braced by ribs 35 welded to the base plate 33. One corner of said base plate 33 is located over the center of the table top, and an anti-friction bearing 36 is mounted therein for journaling the lower end of a vertical pivot shaft 37 over the exact center of the table top. The upper end of said shaft 37 is journaled in a similar bearing 36' which is mounted in an arm 38 extending laterally from the top of column 32. The two bearings 36 and 36' are mounted coaxial with the center of the table top 22 so as to journal the pivot shaft on a vertical axis passing through said center.

A vertical adjusting screw 40 is mounted in offset relation to said shaft 37 by upper and lower bracket arms 41 and 42 respectively, having split portions clamped around the shaft 37 by bolts 40'. The lower end of the screw 40 is journaled in lower bracket arm 42, and the upper portion is journaled in anti-friction thrust bearings 43 on opposite sides of the upper bracket arm 41 and backed up by collars 44 and 45 secured to the screw 40 as by set screws. The upper end of screw 40 has a hand wheel 46 thereon. A laterally extending support arm indicated generally at 47 is vertically adjustably mounted on said adjusting screw 40 and extends over the plaster model M.

Preferably, the arm 47 is laterally slidable in a slide bracket 48 having a split clamping ear 49 extending rearwardly therefrom and engirdling the pivot shaft 37. A locking screw 50 extends through one portion of said ear 49 and is threaded into the other portion for clamping the ear on the shaft 37. The screw 50 is journaled in a bracket 51 on the rear of the slide and has a handle 51' secured on its outer end. A bracket nut 52 (Fig. 4) is secured on the rear of the slide 48 by bolts 53, and the vertical adjusting screw 40 is threaded through said nut. Thus, by turning the locking screw 50 to loosen the clamp 49, and then turning the hand wheel 46 and adjusting screw 40, the slide bracket 48 and the arm 47 carried thereby can be raised or lowered to any desired position where it is locked by the locking screw 50.

Figures 4, 5:
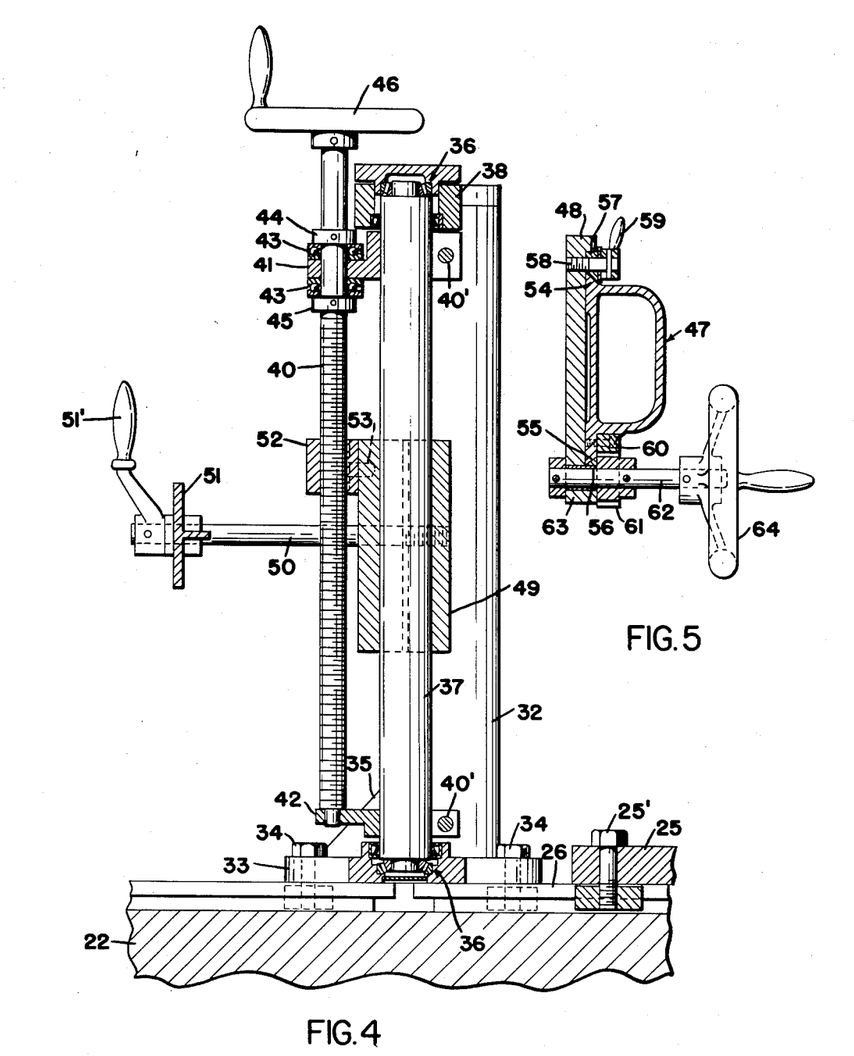
Fig. 4 is an enlarged fragmentary sectional view on line 4—4, Fig. 1.
Fig. 5 is an enlarged sectional view on line 5—5, Fig. 1.

As shown in Fig. 5, the top and bottom edges 54 and 55 of the arm 47 are beveled. The bottom edge is slidably supported on a flange or way 56 in the slide, beveled to complement the edge 55. The upper edge 54 of the arm fits under the complemental beveled edge of a locking gib bar 57 adjustably secured to the slide by locking studs 58 having handle levers 59 secured on the outer ends. Thus, the gib bar provides a way or track for the arm when the studs are slightly loosened, and wedges against the upper edge of the arm to lock the same when the studs are tightened.

A rack bar 60 is secured to the arm 47 along the front face of its bottom edge, and a pinion 61 meshing with the rack is mounted on the shaft 62 journaled in a bracket ear 63 on the lower edge of the slide 48, and having a hand wheel 64 on its front end. By loosening the levers 59 and turning wheel 64 the arm is adjusted laterally of the pivot shaft 37. As shown in Fig. 5, the support arm 47 is preferably tubular is cross section throughout the length of the rack bar 60, to impart torsional strength and rigidity to the arm for maintaining its outer end accurately in position.

The outer end of arm 47 is preferably rounded or semicircular as indicated at 66, and is provided with diametrically opposite arcuate slots 67 for adjustable connection with a curved track section in a vertical plane, on which the engraving tool carriage is mounted. A series of curved tracks of varying radii is provided, two tracks of different radii in a series being shown at 68 and 69 in Figs. 6 and 15. Each of the tracks is provided at one end with a circular series of bolt holes 70, diametrically opposite pairs of which are adapted selectively to register with the slots 67 for supporting the track in a vertical plane on the arm by inserting bolts 71 into the registering slots and holes.

The curved tracks are designed to provide for the operation of the engraving tool in a vertical plane over a range of radii, in this case from a radius of zero inches to 25 inches. The engraving tool 73 is mounted on a carriage 74 which rolls on the track. The tool is radially adjustable on the carriage sufficiently to vary the operating radius of the tool from the center of curvature of the track by an amount at least equivalent to the change in radius of the next track in the series. For example, if the mean radius of one track varies 3 inches from the mean radius of the next, the tool 73 must be radially adjustable on the carriage a distance of at least 3 inches so as to cover operating radii between those provided by the fixed radii of the two tracks. Preferably, the tool is adjustable over a somewhat greater distance, say 4 inches, to provide for a certain amount of overlap as an operating convenience.

Figure 8:
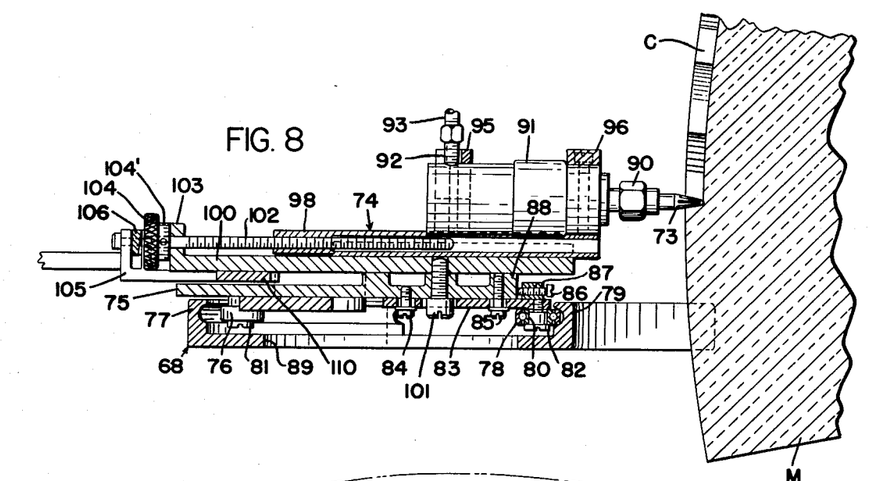
Fig. 8 is a sectional view on line 8—8, Fig. 6.

Referring to Figs. 7-11 inclusive, the carriage 74 includes a substantially triangular or sector-shaped plate 75 which carries rollers at its corners for rolling in the track flanges. Two rollers 76 roll in the grooved outer flange 77 and the other roller 78 at the apex of the plate 75 rolls in the grooved inner track flange 79. As shown in Fig. 8, the rollers 76 and 78 are preferably journaled on anti-friction bearings 80 mounted on studs 81 and 82. The studs 81 for rollers 76 are screwed in plate 75, and stud 82 is screwed into a mounting plate 83 which is adjustable on the sector plate 75. The mounting plate 83 is movably secured to sector plate 75 by screws 84 and 85 extending through slots in plate 83. An adjusting screw 86 threaded through a block 87 on plate 83 abuts the face of a circular boss 88 on plate 75. By loosening screws 84 and 85 and turning screw 86 the mounting plate 83 and roller 78 may be adjusted toward or away from the inner track to facilitate mounting the carriage in tracks of varying radii and to insure good contact between the rollers and track flanges. An access hole 89 is provided in the web of each of the tracks to expose the heads of screws 84 and 85.

The engraving tool 73 is mounted by means of a chuck 90 on the shaft of a conventional compressed air motor 91 having an air inlet 92 connected to a flexible air supply conduit 93. The motor 91 is mounted in a slide frame 94 by means of separable cylindrical clamps 95 and 96 secured together by screws 97. The frame 94 has a dovetail base 98 slidable in a complementary portion 99 of guide bar 100, which is rotatably mounted on the circular boss 88 of sector plate 75 by a screw stud 101 accessible through access hole 89.

The motor frame 94 is adjusted in the guide 99 by means of a screw 102 threaded longitudinally through the base 98 of the frame and journaled at its outer end in a flange 103 of guide bar 100. A knurled thumb nut 104 is secured on the outer end of the screw rotatably abutting flange 103. Means for engaging the thumb nut to hold the screw in adjusted position preferably includes a bracket arm 105 secured on guide bar 100 and pivotally mounting a latch lever 106 for wedgably contacting the center of the thumb nut 104, as shown in Fig. 8. The shank of thumb nut 104 may be provided with a vernier scale 104' as shown to register with an indicator mark on flange 103 to indicate the relative position of the screw. By swinging the latch 106 to an inoperative position, the slide may be rapidly withdrawn to remove the tool 73 from its groove in the model and then returned to the same position. This feature is very useful when it is necessary to pass over portions of the tread without cutting.

Figure 3:
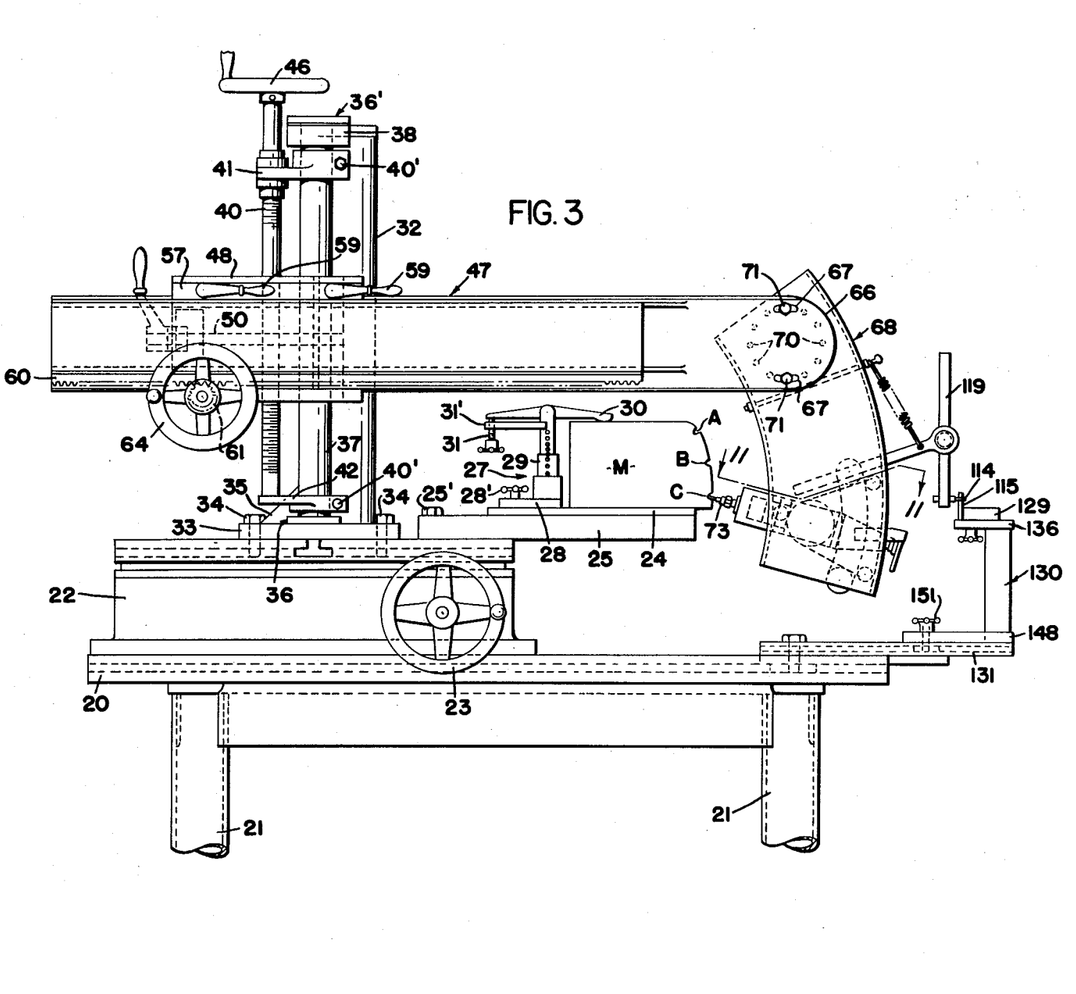
Fig. 3 is a front elevation of the machine.

An indicator bar 107 is secured on the underside of guide bar 100 and has an indicator mark for registering with the graduations of a scale 108 on the sector plate. When the indicator registers with the zero graduation the axis of the tool is aligned with a radius of the track 68, and by loosening screw 101 the guide 99 can be rotated to swing the tool in a vertical plane to a desired degree of angularity. Such a position of the tool is shown in Fig. 3.

Figure 9:
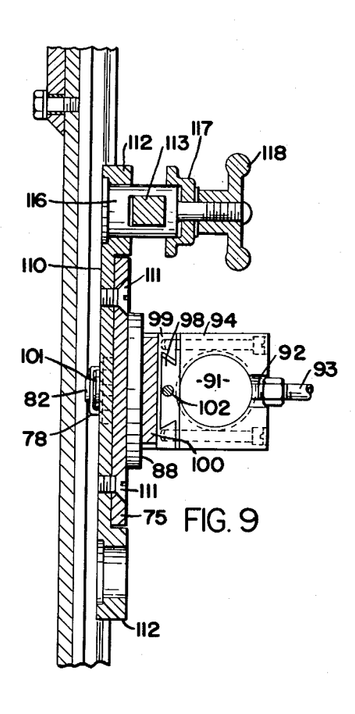
Fig. 9 is a sectional view on line 9—9, Fig. 6.

A curved adaptor bar 110 is secured to the underside of sector plate 75 by screws 111, and its ends project beyond the top and bottom of the plate and have circular mounting bosses 112 thereon for selectively supporting one end of a preferably square bracket arm 113, which supports the follower or stylus 114 cooperating with an arcuate template 115 provided with the outline of the tread pattern. As seen in Fig. 9, a flanged cylindrical clamping stud 116 is seated in the upper boss 112 and has a square hole through which arm 113 passes and in which it is adjustably clamped by collar 117 and hand nut 118. At its other end, the arm 113 has a circular boss in which a square vertical arm 119 is adjustably clamped by a similar clamping stud and hand nut 120. A holder for the follower pin 114 (Fig. 14) may consist of a block 121 carrying the pin and vertically slidable in a bracket plate 122 secured on the lower end of arm 119 by screws 123. A screw 124 provides for accurately adjusting the block 121 vertically.

Figures 6, 7:
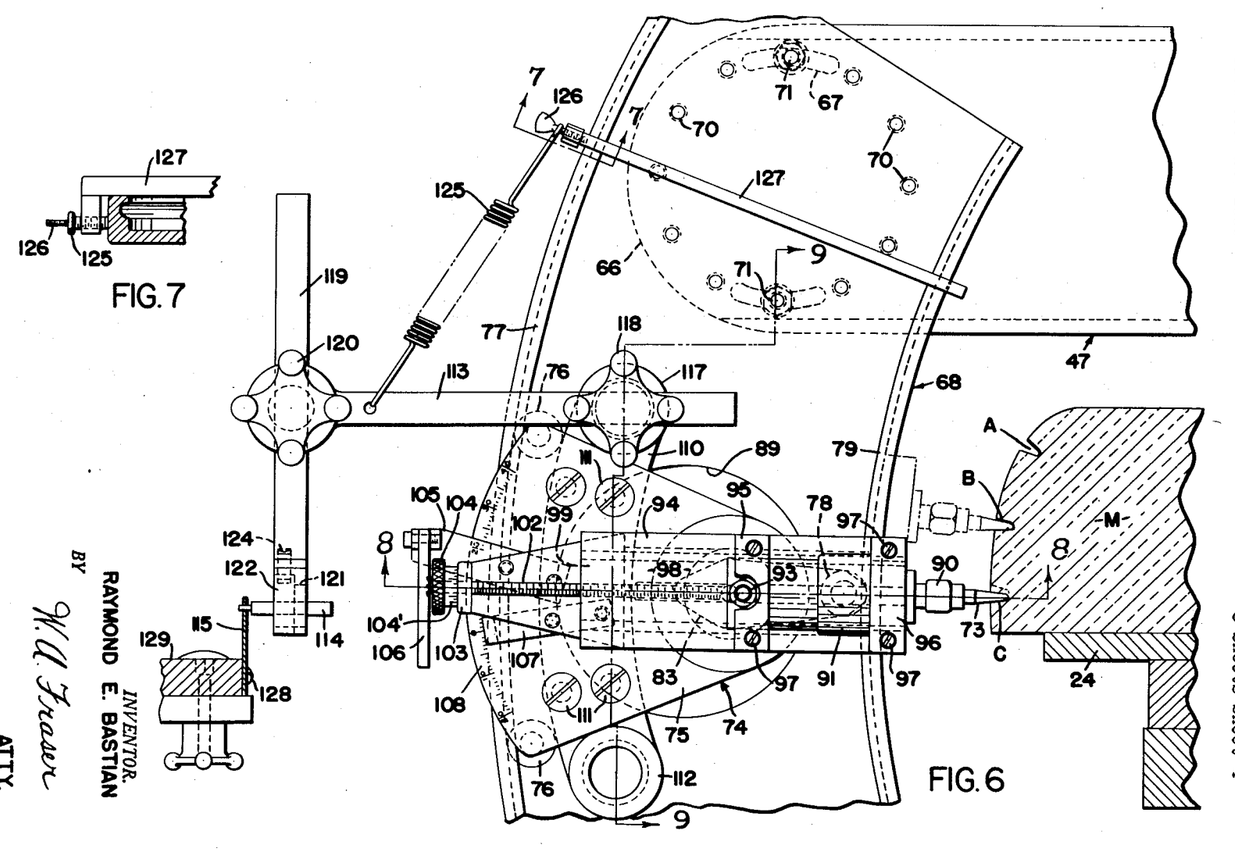
Fig. 6 is an enlarged sectional view on line 6—6, Fig. 1.
Fig. 7 is a fragmentary sectional view on line 7—7, Fig. 6.
Figures 15, 16:
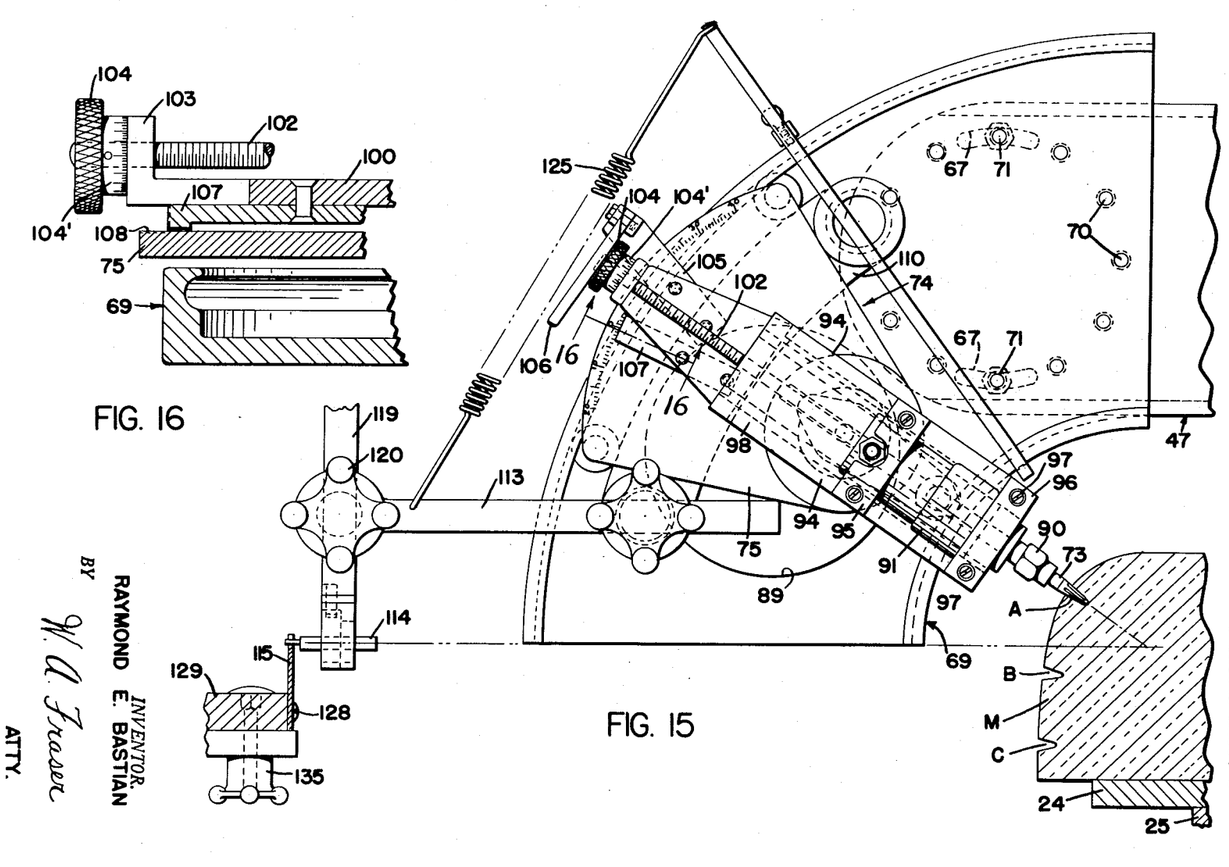
Fig. 15 is a view similar to Fig. 6, showing the tool carriage mounted on another of the curved tracks having a different radius.
Fig. 16 is a fragmentary sectional view on line 16—16, Fig. 15.

Preferably, a counterbalance is provided for the arm 113 supporting the follower pin to compensate for the weight of the carriage 74 and parts carried thereby. Such counterbalance may consist of a helical tension spring 125 secured at one end to the arm 113 and connected at its other end to a screw stud 126 which secures a clamping bracket 127 to the track 68. As shown in Figs. 6 and 7, the bracket 127 may span the track and engage over the opposite flanges thereof. As shown in Fig. 15, the arm 113 may be clamped in the lower boss 112 of adaptor bar 110 where the position and curve of the track 69 being used places the lower boss in a more accessible position.

Figures 1, 2:
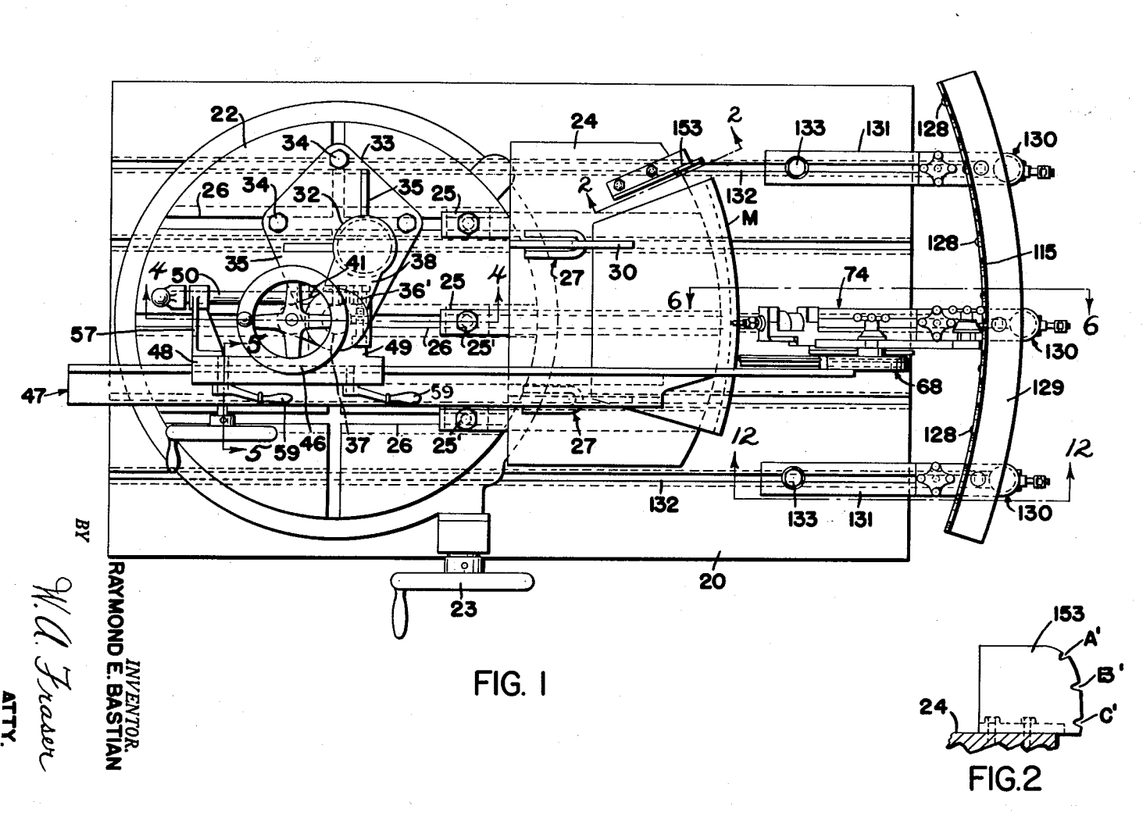
Fig. 1 is a plan elevation of the novel machine with a plaster model clamped in position to be engraved.
Fig. 2 is a fragmentary sectional view on line 2—2, Fig. 1, showing in elevation the set-up template which is mounted at one end of the plaster model.

The engraving template 115 is curved in a horizontal plane in proper relation to the model M. Referring to Fig. 1, the template is curved about the same center as the outer curve of the model so as to be concentric with the outer curve of the model when the model and template are properly positioned in relation to the central axis of the table top 22. Preferably, the engraving template is secured by screws 128 to a curved strip 129 of plywood which has been accurately cut and sanded to the proper radius. The strip 129 is supported at three circumferentially spaced points by pedestals 130 which are mounted on bars 131 secured in parallel slots 132 in the table bed 20 by T-headed bolts 133.

Figures 12, 13:
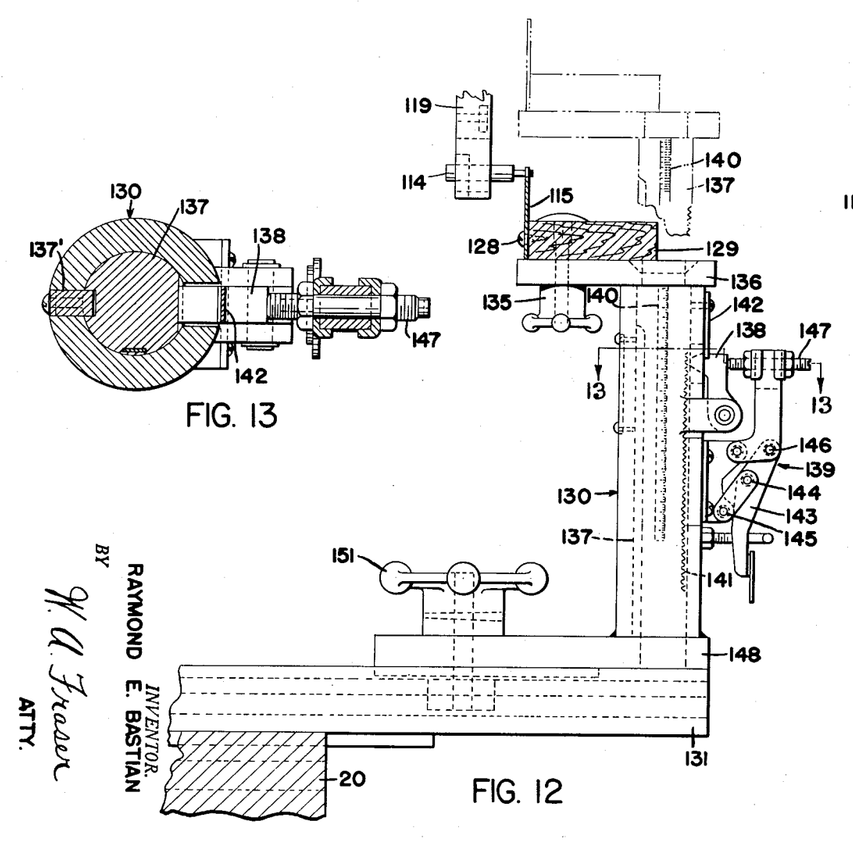
Fig. 12 is an enlarged sectional view on line 12—12, Fig. 1.
Fig. 13 is a sectional view on line 13—13, Fig. 12.
Figure 14:
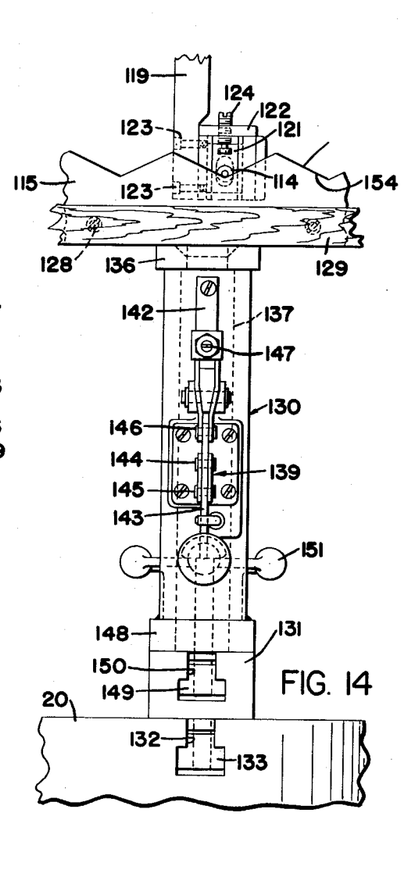
Fig. 14 is a side elevation of the parts shown in Fig. 12.

Referring to Figs. 12-14 inclusive, the template 115 and strip 129 are clamped by bolts 135 to the top plates 136 of each pedestal assembly 130. Each top plate 136 is secured to the top of a jack post 137 telescopingly slidable in the pedestal and having a precision cut rack on one side cooperating with a notched pawl 138 operated by a conventional toggle clamp indicated generally at 139 to hold the post 137 in adjusted position such as shown in chain lines in Fig. 12. Each jack post 137 is provided with a graduated scale 140 along one side so that the three jack posts can be set accurately at the same level, and is splined to a key 137' to prevent turning of the post.

The pawl 138 is resiliently held in engagement with the rack teeth 141 on the jack post by a spring plate 142 engaging a notch on the top of the pawl. When the clamp 139 is operated to release the pawl, the jack post can be raised or lowered manually by grasping the bar 136 attached thereto, and when the post is moved to a desired position as indicated by the scale 140, the pawl is locked by moving the handle 143 of the toggle clamp to the position of Fig. 12, where the pivot 144 is over center with respect to pivots 145 and 146. An adjusting screw 147 is preferably provided in the upper end of the clamp for engaging the pawl in locked position.

The base plate 148 of the pedestal 130 is preferably adjustably mounted on the bar 131 for movement longitudinally thereof by means of a T-headed clamping bolt 149 slidable in a T slot 150 in the bar and having a hand nut 151 for clamping the bolt in adjusted position in the bar.

Figure 10:
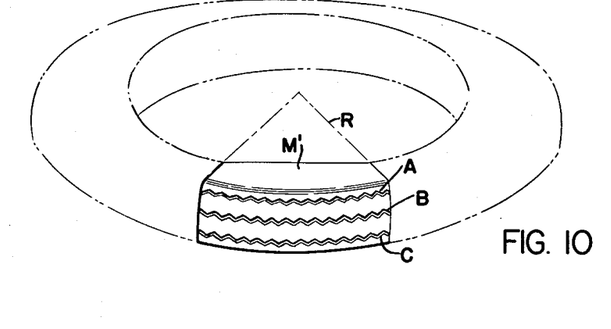
Fig. 10 is a schematic view showing the portion of a tire represented by the plaster model.
Figure 11:
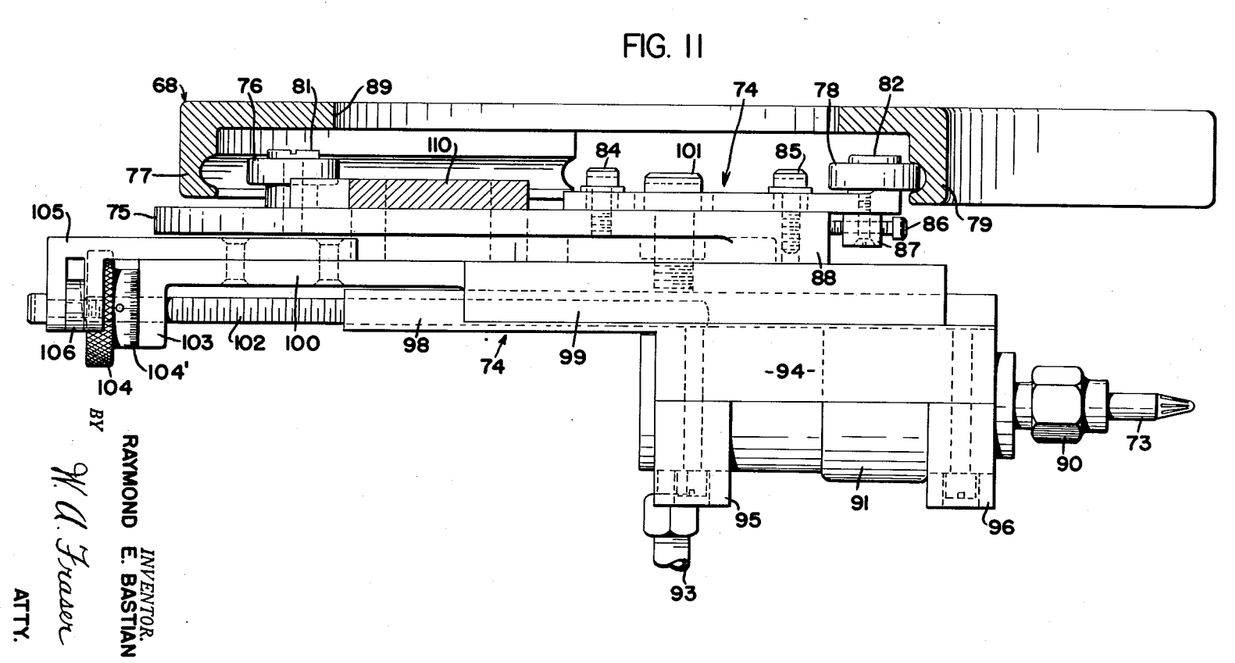
Fig. 11 is an enlarged sectional view on line 11—11, Fig. 3.

In the operation of the novel apparatus a block of plaster representing a split section of the tire mold, as indicated at M' in Fig. 10, is first formed with its outer surface curved on a radius R circumferentially of the tire to be produced, and curved transversely according to a predetermined design. This transverse curve is usually a composite curve having several radii as shown in the cross section of the model M in Fig. 6, and varies according to the particular tire. As shown in Fig. 10, the tread design may consist of a series of serrated grooves A, B and C, and these grooves are engraved in the plaster model by using the present apparatus.

The model block M having its outer surface curved and contoured according to a predetermined design is placed on the support plate 24 in proper position with its outer circumference curved about the center post 37 on the proper tire radius, and the model clamped in place by the clamps 27. Obviously this radius is adjustable for a wide variety of tires, by adjusting the clamps 27 on the plate 24 and by adjusting the bars 25 on the table top 22. A set-up template 153 (Fig. 2) having a profile corresponding to the desired cross section of the model is mounted on plate 24 adjacent one end of the model with its outer edge circumferentially coincident with the outer surface of the model.

Next the proper track is selected according to the transverse radius of that portion of the tread in which the particular groove is to be cut. Thus, if the groove A is being cut, as indicated in Fig. 15, a track 69 is selected having a radius which allows the tool 73 to swing transversely on the same radius as the tread radius in which groove A is located. If groove C is being cut, as indicated in Figs. 3 and 6, a track 68 is selected having a radius corresponding to the tread radius in which groove C is located. Now by using suitable scales and straight edges the track is positioned on the outer end of the arm so that its radial center coincides with the radial center of the transverse curve of the model where the cut is to be made. The tool carriage is then inserted in the track and the screw 102 turned to bring the point of the tool within the corresponding groove A' or C' of the set up template 153. Assuming that the groove C is being cut, the tool would be in a position such as shown in Fig. 6.

The engraving template 115 is mounted on the pedestals 130 in concentric relationship to the model M, and the pedestals are adjusted to bring the serrated edge 154 (Fig. 14) of the template level with the center of the cutting radius. The serrated edge is accurately proportioned to correspond with the predetermined design of the corresponding groove to be cut in the model, as indicated in Fig. 10, so that when the stylus 114 is made to follow the template 115 the cutting tool 73 will cut the model along the desired path. After the template 115 is positioned, the tool 73 is placed in the desired groove of the set-up template and the supporting arms 113 and 119 adjusted to bring the stylus into engagement with one end of the engraving template 115.

The air motor is then started to drive the tool 73 and the stylus 114 guided along the serrated edge of the template 115 to make the corresponding serrated cut in the model M. As the stylus follows along over the template the main support arm swings about the center post 37 in a horizontal plane, and the cutting tool swings on the track in a vertical plane on the proper radius and transversely of the model.

As shown in Figs. 6 and 15, the grooves may have sides at equal angles or parallel and the tool 73 may be similarly shaped so that each groove may be cut in one pass. Otherwise, the tool may require tilting, as shown in Fig. 3, to cut first one side and then the other of a groove, and the sides of the groove may be undercut in this fashion if desired. If sharp corners are required at the bottom of the grooves these can be cut by passing a knife edged stylus through the groove after it has been cut.

As indicated in Fig. 15, a different track 69 may be required to cut the groove A because of the different tread radius at that zone. This will require proper positioning of the new track relative to the model, and resetting of the stylus in the engraving template. Changing the position of the stylus supporting arms 113 and 119 from one side of the carriage to the other may also be required, as indicated in Fig. 15.

It will be apparent that the novel apparatus has a wide range of adjustability for engraving tire mold models of various sizes, and that the cutting tool can be adjusted to cut at any desired angle at any radius from the center line of the machine, while following the profile of engraving templates having widely different designs. An important feature of the machine is that while the tool swings on the correct radius in relation to the outer contour of the model, it may cut a groove on a different radius in relation to the center line or parting line of the model. Thus, the tool operates in three dimensions at the same time in cutting the groove in proper relation to the model.

The novel machine is also adapted for cutting various designs along the sides of the tread portion of the model by using proper templates and manipulating the circular rotating table.

By the use of the novel machine of the present invention, plaster models for treads of widely varying designs can be accurately machine cut, thereby substantially eliminating all hand engraving in connection with engraving plaster models for tire molds.

What is claimed is:

1. Apparatus for engraving positive tire tread mold models having a tread surface circumferentially curved on the radius of the tire, a transverse curved contour having a plurality of radii and a flat surface corresponding to the parting line of the mold, including a support for engaging said flat surface, an engraving tool, arm means extending radially outward of said model support, means selectively mounting said tool on the outer end of said arm for arcuate movement transversely of said model in a path corresponding to one of the several radii of the transverse contour of the tread surface, means for adjusting said tool for varying the radius of said path, means pivoting said arm means for swinging bodily on the tire radius, a template conforming to an arcuate section of a predesigned groove in the tire tread, means supporting said template in concentric relation to said model, and a follower on said tool for cooperating with said template as the arm means is swung bodily on the tire radius.

2. Apparatus for engraving positive tire tread mold models having a tread surface circumferentially curved on the radius of the tire, a transverse curved contour having a plurality of radii and a flat surface corresponding to the parting line of the mold, including a support for engaging said flat surface, an engraving tool, arm means extending radially outward of said model support, means selectively mounting said tool on the outer end of said arm for arcuate movement transversely of said model in a path corresponding to one of the several radii of the transverse contour of the tread surface, means for adjusting said tool for varying the radius of said path, means pivotally mounting said tool on said arm means for independent adjustment about an axis perpendicular to the plane of said arcuate movement of the tool, means pivoting said arm means for swinging bodily on the tire radius, a template conforming to an arcuate section of a predesigned groove in the tire tread, means supporting said template in proper relation to said model, and a follower on said tool cooperating with said template as the arm means is swung bodily on the tire radius.

3. Apparatus for engraving tire tread mold models having a positive tread surface curved on the radius of the tire and a flat surface corresponding to the median plane of the tire, including a table top, a support on said table top for the flat surface of said model, an extensible arm extending over and outwardly of said model support, means pivoting the inner end of said arm on said table top, means for adjusting said support and pivoting means relative to each other to position said model at a desired tire radius, a track removably mounted on the outer end of said arm, said track disposed transversely of the median plane of the model and arcuately curved about the center of transverse curvature of a portion of the tread surface, a tool carriage movably mounted on said track, an engraving tool pivoted on said carriage on an axis perpendicular to the plane of the track, a template conforming to an arcuate section of a predesigned groove in the tire tread, means supporting said template on said table top concentric with said model, and a follower on said tool carriage for cooperating with said template as the arm is swung about its pivot on the desired tire radius.

4. Apparatus for engraving tire tread mold models having a positive tread surface curved on the radius of the tire and a flat surface corresponding to the median plane of the tire, including a table top, a support on said table top for the flat surface of said model, an extensible arm extending over and outwardly of said model support, means pivoting the inner end of said arm on said table top, means for adjusting said support and pivoting means relative to each other to position said model at a desired tire radius, a track removably mounted on the outer end of said arm, said track disposed transversely of the median plane of the model and arcuately curved about the center of transverse curvature of a portion of the tread surface, a tool carriage movably mounted on said track, an engraving tool slidably and pivotally mounted on said carriage for adjustment radially of said track and for independent adjustment about an axis perpendicular to the plane of the track, a template conforming to an arcuate section of a pre-designed groove in the tired tread, means supporting said template in proper relation to said model, and a follower on said tool carriage cooperating with said template as the arm is swung about its pivot on the desired tire radius.

5. Apparatus for engraving tire tread mold models having a positive tread surface curved on the radius of the tire and a flat surface corresponding to the median plane of the tire, including a table top, a support on said table top for the flat surface of said model, an extensible arm extending over and outwardly of said model support, means pivoting the inner end of said arm on said table top, means for adjusting said support and pivoting means relative to each other to position said model at a desired tire radius, a track removably mounted on the outer end of said arm, said track disposed transversely of the median plane of the model and arcuately curved about the center of transverse curvature of a portion of the tread surface, a tool carriage movably mounted on said track, an engraving tool mounted on said tool carriage for adjustment radially of said track, a template conforming to an arcuate section of a pre-designed groove in the tire tread, means supporting said template on said table top, and a follower on said tool carriage for cooperating with said template.

6. Apparatus for engraving tire tread mold models having a positive tread surface curved on the radius of the tire and a flat surface corresponding to the median plane of the tire, including a table, a flat horizontal support on the table for the flat surface of the model, an upright pivot post journaled on said table, an arm mounted at one end on said post for vertical and lateral adjustment relative thereto and extending radially outward of said model support, means for adjusting said model support and post relative to each other, a track removably mounted on the other end of said arm, said track disposed vertically and arcuately curved about the center of transverse curvature of the tread surface, a tool carriage mounted on said track for movement bodily along the curve thereof, an engraving tool mounted on said carriage for adjustment radially of said track, a template conforming to an arcuate section of a pre-designed groove in the tire tread, means supporting said template in proper relation to said model, and a follower on said carriage for cooperating with said template.

References Cited in the file of this patent

UNITED STATES PATENTS

| | | |
|---|---|---|
| 614,845 | Dedrick | Nov. 29, 1898 |
| 1,481,381 | McClellan | Jan. 22, 1924 |
| 1,601,999 | Cullen | Oct. 5, 1926 |
| 1,669,904 | Keller et al. | May 15, 1928 |